United States Patent [19]
Brewer

[11] Patent Number: 5,387,021
[45] Date of Patent: Feb. 7, 1995

[54] CABLE GRASPING TOOL

[76] Inventor: David E. Brewer, 16675 Beulah Rd., Dawsonsprings, Ky. 42408

[21] Appl. No.: 88,376

[22] Filed: Jul. 9, 1993

[51] Int. Cl.$^6$ .............................................. B66C 1/62
[52] U.S. Cl. .................................... 294/19.1; 294/115
[58] Field of Search ...................... 294/1.4, 19.1, 50.8, 294/50.9, 104, 115; 403/377

[56] References Cited

U.S. PATENT DOCUMENTS

| | | | |
|---|---|---|---|
| 80,350 | 7/1868 | Hoffman | 294/19.1 X |
| 2,191,858 | 2/1940 | Moore | 294/19.1 |
| 2,803,484 | 8/1957 | Puckett | 294/19.1 X |
| 2,891,811 | 6/1959 | Strickler | 294/50.9 X |
| 3,473,837 | 10/1969 | Goodman | 294/19.1 X |
| 3,489,451 | 1/1970 | Guckenberger | 294/19.1 |
| 4,037,867 | 7/1977 | Fano et al. | 294/1.4 |
| 4,378,671 | 4/1983 | Gascon | 294/50.9 X |
| 4,779,913 | 10/1988 | Henry | 294/50.9 |

Primary Examiner—Dean J. Kramer
Attorney, Agent, or Firm—E. Michael Combs

[57] ABSTRACT

A tool structure including an outer sleeve, having a slide rod slidably directed coaxially of the sleeve, having a slide rod jaw fixedly mounted to the rod exteriorly of the sleeve, with a pivot jaw pivotally mounted to the slide rod jaw, the pivot jaw having an extension rod including an actuator link. with the actuator link mounted pivotally to the sleeve, whereupon pulling of the sleeve effects directing of the pivot jaw to the slide rod jaw for the grasping of a cable.

3 Claims, 4 Drawing Sheets

CABLE GRASPING TOOL

BACKGROUND OF THE INVENTION

1. Field of the Invention

The field of invention relates to cable manipulation tool structure, and more particularly pertains to a new and improved cable grasping tool wherein the same effects ease of manipulation in grasping of cables.

2. Description of the Prior Art

Various pipe handling structure is indicated in the prior art, wherein U.S. Pat. No 4,836,595 sets forth a pipe manipulation tool.

Various remote operative structure is indicated in the U.S. Pat. Nos. 4,863,204 and 4,669,769 for the remote manipulation of tool jaws.

The instant invention attempts to overcome deficiencies of the prior art by providing for a remote clamping structure arranged for the remote grasping of cables, including a pivot jaw mounted to a fixed jaw, wherein the fixed jaw is in turn mounted to a rod structure slidably mounted within an outer sleeve, that in turn mounts the pivoted jaw and in this respect, the present invention substantially fulfills this need.

SUMMARY OF THE INVENTION

In view of the foregoing disadvantages inherent in the known types of tool apparatus now present in the prior art, the present invention provides a cable grasping tool wherein the same includes pivoted jaws remotely operative relative to an individual to effect ease of grasping and manipulation of cables and the like. As such, the general purpose of the present invention, which will be described subsequently in greater detail, is to provide a new and improved cable grasping tool which has all the advantages of the prior art tool apparatus and none of the disadvantages.

To attain this, the present invention provides a tool structure including an outer sleeve, having a slide rod slidably directed coaxially of the sleeve, having a slide rod jaw fixedly mounted to the rod exteriorly of the sleeve, with a pivot jaw pivotally mounted to the slide rod jaw, the pivot jaw having an extension rod including an actuator link, with the actuator link mounted pivotally to the sleeve, whereupon pulling of the sleeve effects directing of the pivot jaw to the slide rod jaw for the grasping of a cable.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, or is it intended to be limiting as to the scope of the invention in any way.

It is therefore an object of the present invention to provide a new and improved cable grasping tool which has all the advantages of the prior art tool apparatus and none of the disadvantages.

It is another object of the present invention to provide a new and improved cable grasping tool which may be easily and efficiently manufactured and marketed.

It is a further object of the present invention provide a new and improved cable grasping tool which is of durable and reliable construction.

An even further object of the present invention is to provide a new and improved cable grasping tool which is susceptible of a low cost of manufacture with regard to both materials and labor, and which accordingly is then susceptible of low prices of sale to the consuming public, thereby making such cable grasping tools economically available to the buying public.

Still yet another object of the present invention is to provide a new and improved cable grasping tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
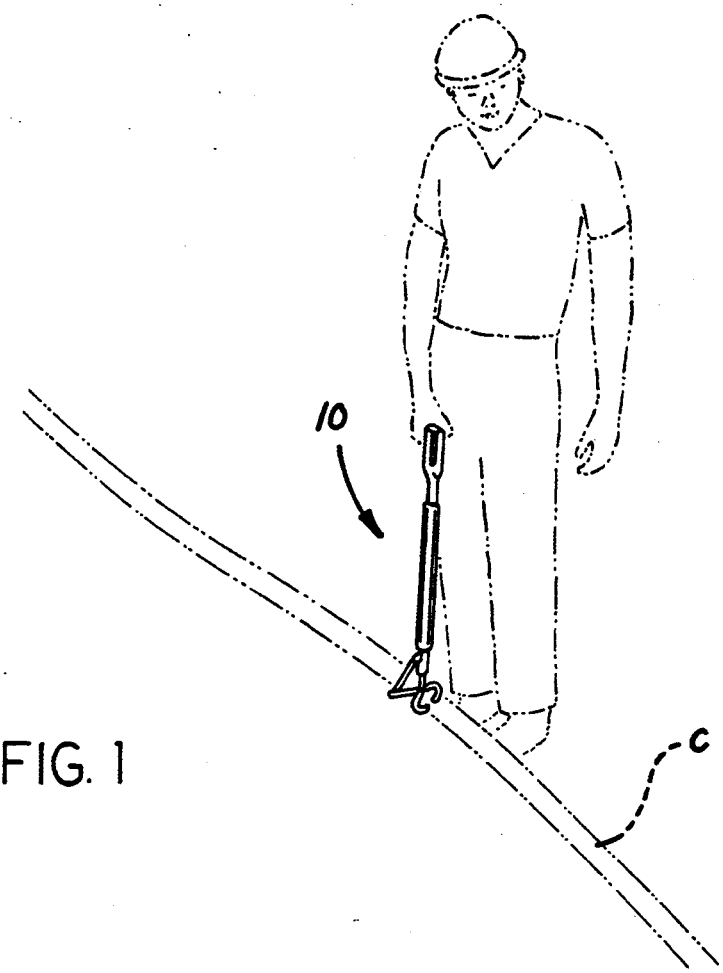
FIG. 1 is an isometric illustration of the invention in use.
Figure 2:
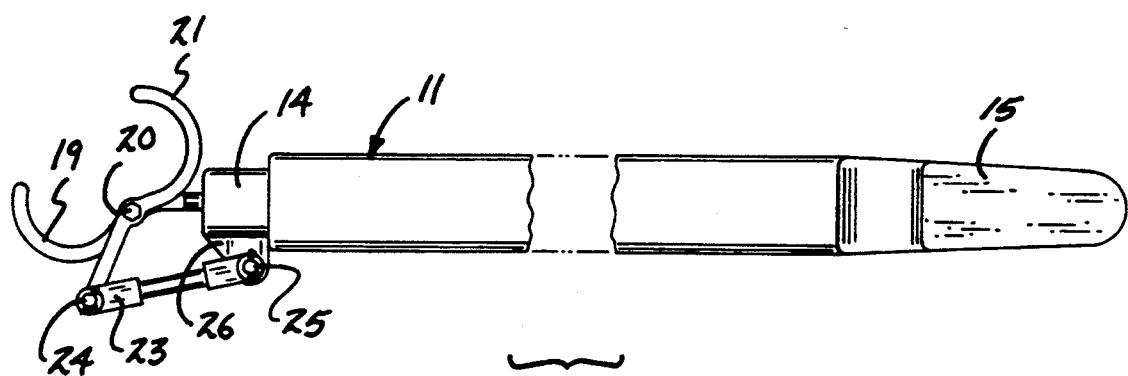
FIG. 2 is an orthographic view of the invention.
Figure 3:
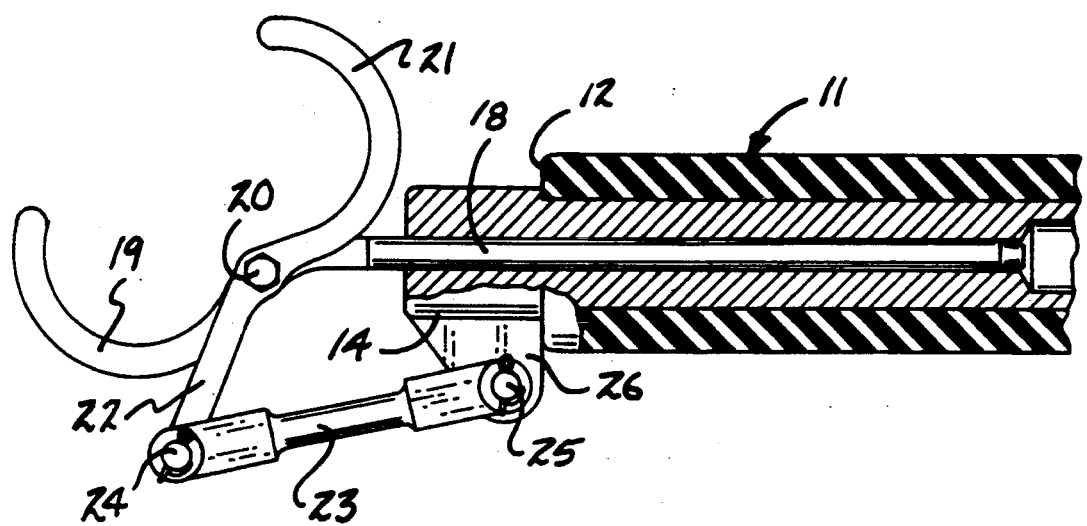
FIG. 3 is an orthographic view, partially in section, of the first end portion of the tool structure.
Figure 4:
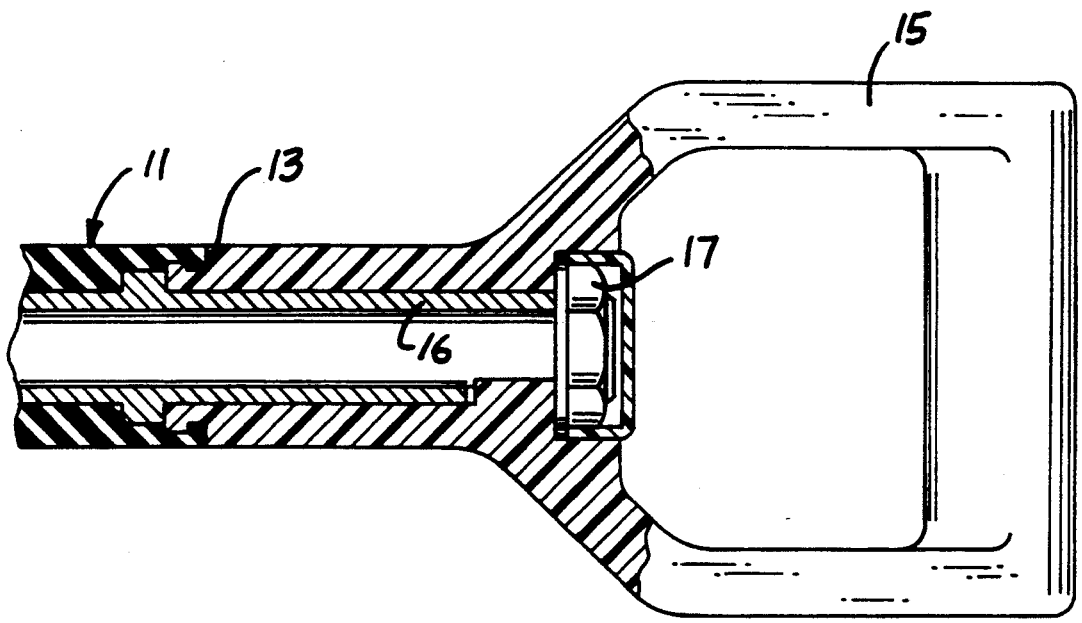
FIG. 4 is an orthographic view, partially in section, the second end portion of the tool structure.

With reference now to the drawings, and in particular to FIGS. 1 to 8 thereof, a new and improved cable grasping tool embodying the principles and concepts of the present invention and generally designated by the reference numeral 10 will be described.

More specifically, the cable grasping tool 10 of the instant invention includes an outer sleeve 11, having a first end 12 spaced from a second end 13. A first end collar 14 is fixedly mounted to the sleeve 11 at its first end 12. A second end handle 15 is mounted to the sleeve 11 at the sleeve second end 13, with the handle 15, the collar 14, and the sleeve 11 in a coaxially aligned relationship. A tubular bushing sleeve 16 mounted within the sleeve 11 extending into the handle 15, where it is secured by a fastener 17. A slide rod 18 slidably mounted within the bushing sleeve 16 is directed into the bushing sleeve through the sleeve first end 12 and extends beyond the sleeve first end 12, having a slide rod jaw 19 of a generally "J" shaped configuration fixedly mounted to the slide rod 18. The slide rod jaw 19 includes a pivot axle 20 directed orthogonally therethrough adjacent the slide rod jaw 19, wherein a pivot jaw 21 is arranged pivotally mounted to the pivot axle 21 in a facing confronting relationship relative to the slide rod jaw 19. The pivot jaw 21 includes an extension rod 22, wherein an actuator link 23 is provided having an actuator link first axle 24 at a first end of the actuator link 23 mounted pivotally to the extension rod 22. The actuator link 23 includes a second axle 25 pivotally mounting a second end of the actuator link 23 to a collar flange 26 that extends fixedly to the first end collar at 14 laterally of the sleeve 11 at the first end 12. In this manner, upon applying tension to the sleeve 11 by the handle 15, the outer sleeve is displaced relative to the slide rod 18 and thereby cooperation of the actuator link 23, the pivot jaw 21 is directed to the slide rod jaw 19 to clamp a cable "C", in a manner as indicated in FIG. 1.

Figure 5:
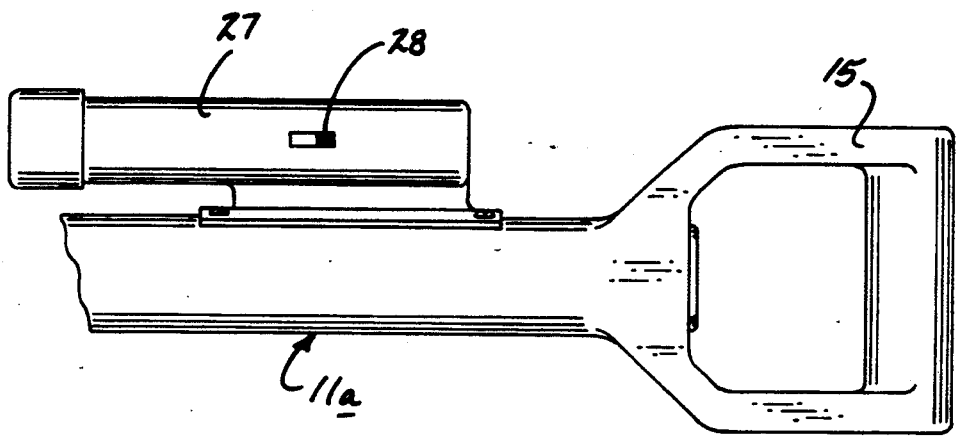
FIG. 5 is an orthographic partial view of the tool, including an optional illumination structure.
Figure 6:
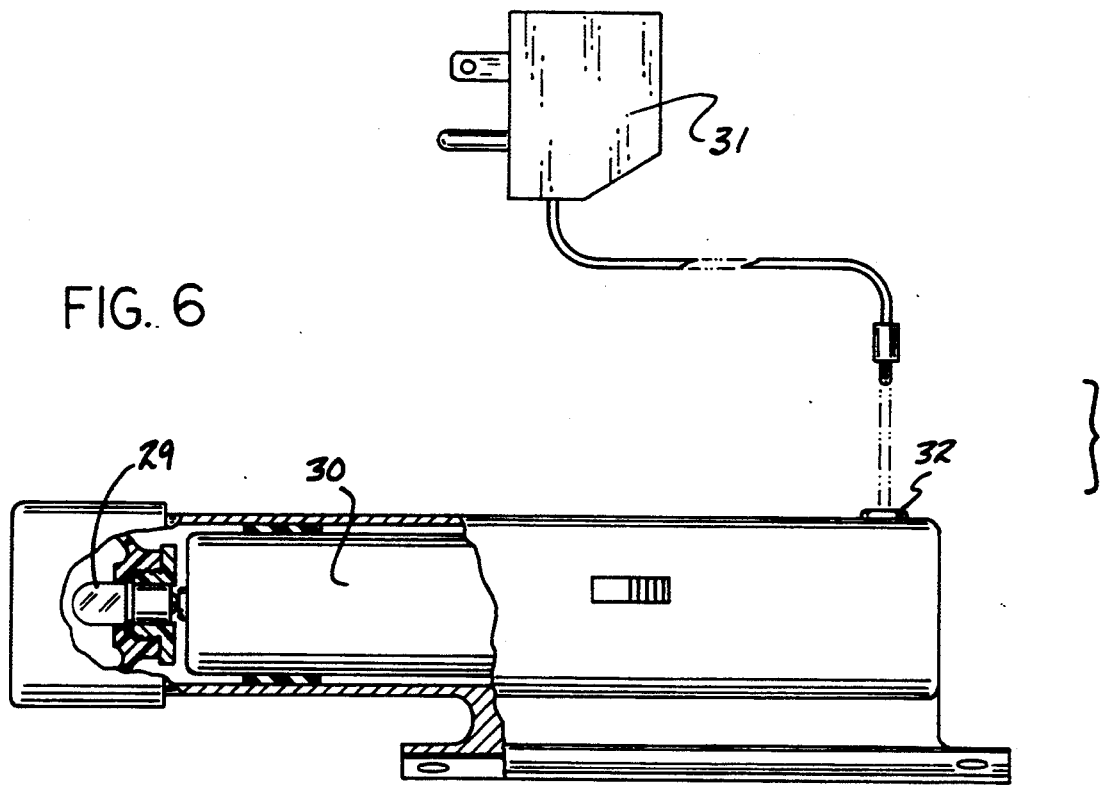
FIG. 6 is an orthographic view, partially in section, of the illumination structure arranged for ease of a recharge devise.

The FIGS. 5 and 6 indicate the use of a modified outer sleeve 11, to include a flashlight tube 27 fixedly mounted to the modified outer sleeve 11a in a parallel relationship relative to the sleeve adjacent the handle 15. The flashlight tube 27 includes an on/off switch 28 to effect electrical illumination of the illumination bulb 29 mounted within the flashlight head through a battery 30. If desired, a recharge unit 31 may be provided to provide for recharging of a rechargeable type battery 30 through a recharge socket 32.

Figure 7:
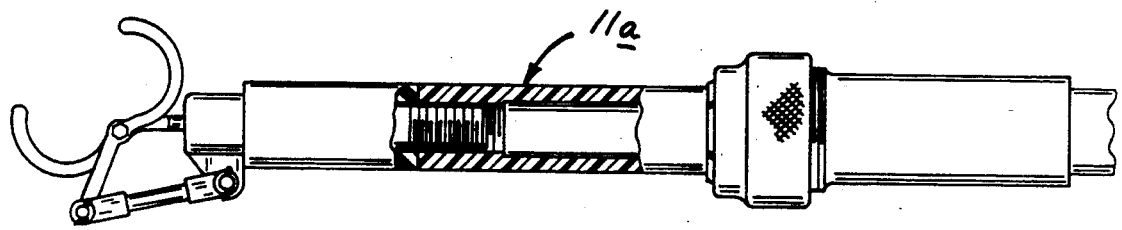
FIG. 7 is an orthographic view of the organization indicating a collet structure to permit projection and extension of the outer sleeve.
Figure 8:
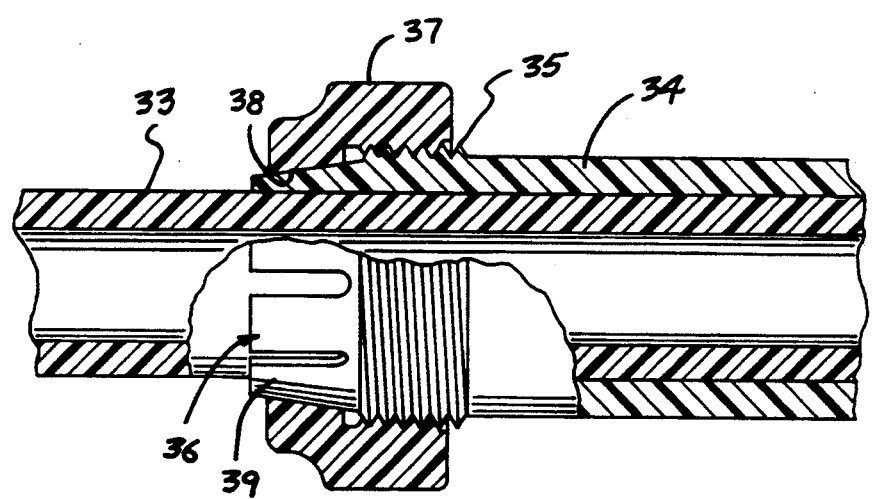
FIG. 8 is an enlarged orthographic cross-sectional illustration of the collet structure employed by the invention.

The FIGS. 7 and 8 indicate the modified sleeve 11a arranged for adjusting in an axially aligned relationship relative to itself, such that the outer sleeve includes an outer sleeve first sleeve 33 received within an outer sleeve second sleeve 34, such that the outer sleeve second sleeve 34 includes a second sleeve threaded end 35 that further is directed to a collet 36 fixedly mounted to the second sleeve 34, wherein the collet includes a collet conical outer wall 39. A locking sleeve 37 threadedly mounted upon the second sleeve threaded end 35 includes a locking sleeve conical locking inner wall 38 cooperatively and slidably mounted upon the collet conical outer wall 39 such that upon threaded mounting and directing of the locking sleeve 37 onto the second sleeve threaded end 35, the collet is compressed to secure the outer sleeve first sleeve 33 the outer sleeve second sleeve 34.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention lo the exact construction and operation shown and described, and accordingly, all suitable modifications and equivalents may be resorted falling within the scope of the invention.

What is claimed as being new and desired to be protected by LETTERS PATENT of the United States is as follows:

1. A cable grasping tool, comprising, an outer sleeve, the outer sleeve including a sleeve first end spaced from a sleeve second end, with a first end collar fixedly mounted adjacent to the outer sleeve first end, and a handle mounted to the outer sleeve second end, with an elongate bushing directed through the first end collar and coaxially aligned with the outer sleeve, and a slide rod slidably received within the bushing, with the slide rod extending from the bushing and the outer sleeve from the outer sleeve first end, with a slide rod jaw fixedly mounted to the slide rod exteriorly of the outer sleeve, and a pivot axle orthogonally directed through, the slide rod Jaw adjacent the slide rod, with a pivot jaw pivotally mounted about the pivot axle, with the pivot jaw in a facing relationship relative to the slide rod jaw, with the pivot jaw including an extension rod extending from the pivot jaw beyond the pivot axle, and a collar flange fixedly mounted to the first end collar, with the collar flange extending laterally of the first end collar, and an actuator link having a link first axle pivotally mounting the actuator link to the pivot jaw extension rod, and the actuator link including an actuator link second .axle pivotally mounting the actuator link to the collar flange, whereupon displacement of the outer sleeve relative to the slide rod effects movement of the pivot jaw towards the slide rod jaw.

2. A tool as set forth in claim 1 wherein the outer sleeve includes a flashlight tube mounted to the outer sleeve adjacent the handle, with the flashlight tube including an illumination head having an illumination bulb, with an on/off switch arranged for actuation of the illumination bulb.

3. A tool as set forth in claim 2 wherein the outer sleeve includes an outer sleeve first sleeve and an outer sleeve second sleeve, the outer sleeve first sleeve is telescopingly received within the outer sleeve second sleeve, with the outer sleeve second sleeve including a second sleeve threaded end receiving the outer sleeve first sleeve, arid the outer sleeve threaded end having a collet extending from the outer sleeve threaded end, with a locking sleeve threadedly received upon the second sleeve threaded end, the collet including a collet conical outer wall, and the locking sleeve including a locking sleeve conical inner wall in sliding engagement with the conical collet outer wall to effect selective securement of the outer sleeve first sleeve to the outer sleeve second sleeve.

* * * * *